US012791086B2

(12) United States Patent
Lin

(10) Patent No.: US 12,791,086 B2
(45) Date of Patent: Nov. 10, 2026

(54) LINEAR ACTUATOR WITH PROTECTION MECHANISM

(71) Applicant: TIMOTION TECHNOLOGY CO., LTD., New Taipei City (TW)

(72) Inventor: Yu-Chang Lin, New Taipei City (TW)

(73) Assignee: TIMOTION TECHNOLOGY CO., LTD., New Taipei City (TW)

(*) Notice: Subject to any disclaimer, the term of this patent is extended or adjusted under 35 U.S.C. 154(b) by 0 days.

(21) Appl. No.: 19/326,580

(22) Filed: Sep. 11, 2025

(65) Prior Publication Data

US 2026/0009453 A1 Jan. 8, 2026

Related U.S. Application Data

(63) Continuation of application No. 18/654,307, filed on May 3, 2024, now Pat. No. 12,442,436.

(60) Provisional application No. 63/472,193, filed on Jun. 9, 2023.

(51) Int. Cl.
*F16H 25/20* (2006.01)
*A47B 9/20* (2006.01)

(52) U.S. Cl.
CPC ................ *F16H 25/20* (2013.01); *A47B 9/20* (2013.01); *A47B 2200/0051* (2013.01); *A47B 2200/0057* (2013.01); *F16H 2025/2031* (2013.01); *F16H 2025/2037* (2013.01); *F16H 2025/2084* (2013.01); *F16H 2025/209* (2013.01)

(58) Field of Classification Search
CPC ............ F16H 25/20; F16H 2025/2031; F16H 2025/2037; F16H 2025/2084; F16H 2025/209; A47B 9/20; A47B 2200/0051
See application file for complete search history.

(56) References Cited

U.S. PATENT DOCUMENTS

| | | | | |
|---|---|---|---|---|
| 6,595,144 | B1 * | 7/2003 | Doyle | A47B 9/00 248/188.4 |
| 9,859,774 | B2 * | 1/2018 | Klinke | G01L 5/0009 |
| 2013/0293173 | A1 * | 11/2013 | Strothmann | A47B 9/20 318/466 |

FOREIGN PATENT DOCUMENTS

| | | | | |
|---|---|---|---|---|
| CN | 102056514 A * | 5/2011 | | A47B 9/20 |
| WO | WO-03056976 A1 * | 7/2003 | | A47B 9/20 |

* cited by examiner

*Primary Examiner* — Zakaria Elahmadi
(74) *Attorney, Agent, or Firm* — HDLS IPR SERVICES; Chun-Ming Shih

(57) ABSTRACT

A linear actuator (1) with the protection mechanism includes: a motor case (10) having a case member (11) with a bottom plate (111) on which a through hole (114) is formed; a drive mechanism (20) accommodated in the case member (11); a transmission mechanism (30) having a machine core (31), a bearing (32), a base seat (33) with an extending plate (332) on which a penetrated hole (333) is formed, and a fasten unit (34) with a head part (341), the machine core (31) is connected to the drive mechanism (20), the bearing (32) is disposed on the base seat (33) and sheathes the machine core (31), the fasten unit (34) is fastened with the bottom plate (111); and a protection structure (40) sheathing the fasten unit (34) and disposed between the bottom plate (111) and the head part (341).

7 Claims, 18 Drawing Sheets

LINEAR ACTUATOR WITH PROTECTION MECHANISM

CROSS-REFERENCE TO RELATED APPLICATIONS

This application is a continuing application of U.S. patent application Ser. No. 18/654,307, filed on May 3, 2024, and entitled "LINEAR ACTUATOR WITH PROTECTION MECHANISM", which claims the benefit of U.S. Provisional Application No. 63/472,193, filed on Jun. 9, 2023. The entire disclosures of the above applications are all incorporated herein by reference.

BACKGROUND OF THE DISCLOSURE

Technical Field

The present disclosure relates to a linear actuator, especially to a linear actuator with a protection mechanism.

Description of Related Art

A related-art linear actuator is commonly applied in an electric bed, a nursing bed, a ward bed, an electric lifting desk or chair and used to adjust the height or the elevation angle. When the aforesaid equipment encounters an obstacle during an adjusting process, an interaction force is generated when the equipment is in contact with the obstacle, and the aforesaid action force is transferred to the linear actuator. The linear actuator may be damaged due to the obstacle if the operation of the linear actuator is not immediately stopped. Moreover, a human may be hurt when the obstacle is the human himself.

For solving the aforesaid problem, an obstacle-encountering protection mechanism capable of detecting the obstacle is provided to the linear actuator, and the obstacle-encountering protection mechanism having a high sensitivity is provided with a unit capable of converting a pressure signal into an electric signal which is served as an obstacle-encountering detection unit. However, when a location where the obstacle-encountering detection unit is disposed has a relatively smaller deformation, the generated deformed stress is not large enough to make the obstacle-encountering detection unit generate an obstacle-encountering warning; and the deformed stress becomes large enough to trigger the obstacle-encountering detection unit when the collision of the linear actuator and the obstacle has happened for a period of time; thus the obstacle-encountering response of the related-art obstacle-encountering protection mechanism is too slow, and the aforesaid disadvantages shall be improved.

SUMMARY OF THE DISCLOSURE

The present disclosure is to provide a linear actuator with a protection mechanism, in which a movement is stopped when a moving process is subjected to an obstacle to lower the possible damage due to the collision and increase the operation safety.

Accordingly, the present disclosure provides a linear actuator with a protection mechanism, which includes a motor case, a drive mechanism, a transmission mechanism, an elastic member and a pressure-sensitive sensor. The motor case has a case member, the case member has a bottom plate, and a through hole is formed on the bottom plate. The drive mechanism is accommodated in the case member. The transmission mechanism has a machine core, a bearing a base seat and a fasten unit, the machine core passes the through hole to be connected to the drive mechanism, the base seat has an extending plate, the extending plate has a penetrated hole, the bearing is disposed on the base seat and sheathes the machine core, the fasten unit passes the penetrated hole to be fastened with the bottom plate, and the fasten unit has a head part. The elastic member and the pressure-sensitive sensor sheathe the fasten unit and is disposed between the bottom plate and the head part.

Advantages provided by the present disclosure are as follows. Because the penetrated hole of the extending plate is deviated from the bearing cave, a better amplifying effect is provided when the machine core is subjected to an obstacle during the moving process, thus an obstacle encountering detection function has a high sensitivity, and a higher safety and reliability are achieved. When encountering the obstacle during a lifting process, the machine core is subjected to an axial action force and the aforesaid axial action force is transferred to the base seat, thus the extending plate is forced to press the protection structure, the elastic member generates a deformation to trigger the pressure-sensitive sensor to sense an obstacle encountering situation. The pressure-sensitive sensor may be disposed in different locations of the elastic member according to actual operation requirements, thus the pressure-sensitive sensor is suitable to be applied in a pull-type linear actuator, a push-type linear actuator or a push-pull-type linear actuator to widen the applicable range. When the pressure-sensitive sensor is malfunction, the pressure-sensitive sensor is conveniently detached or replaced by removing the fasten unit from the bottom plate. As such, the operation and maintenance are simplified.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

Figure 1:
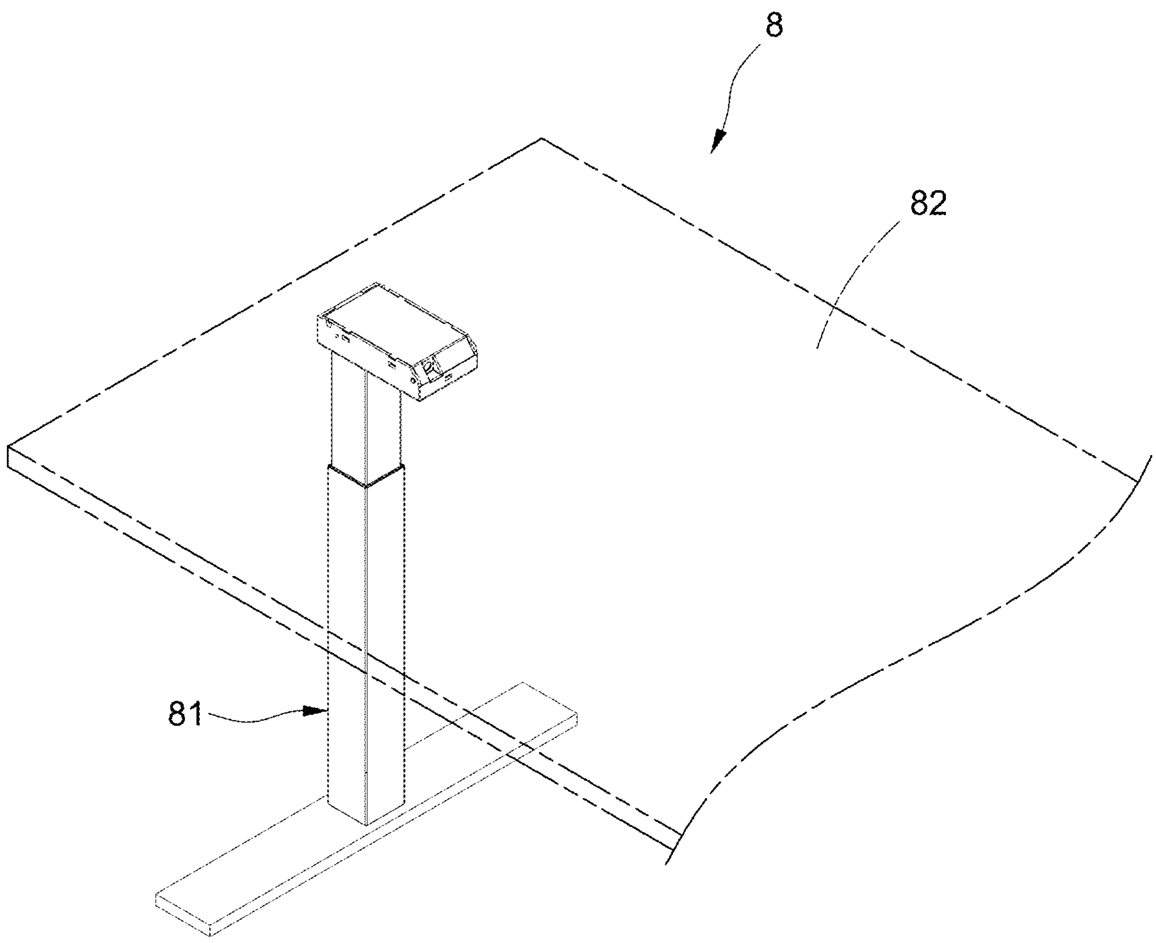
FIG. 1 is a schematic view showing the linear actuator with the protection mechanism being applied to an electric table according to the first embodiment of the present disclosure.
Figure 2:
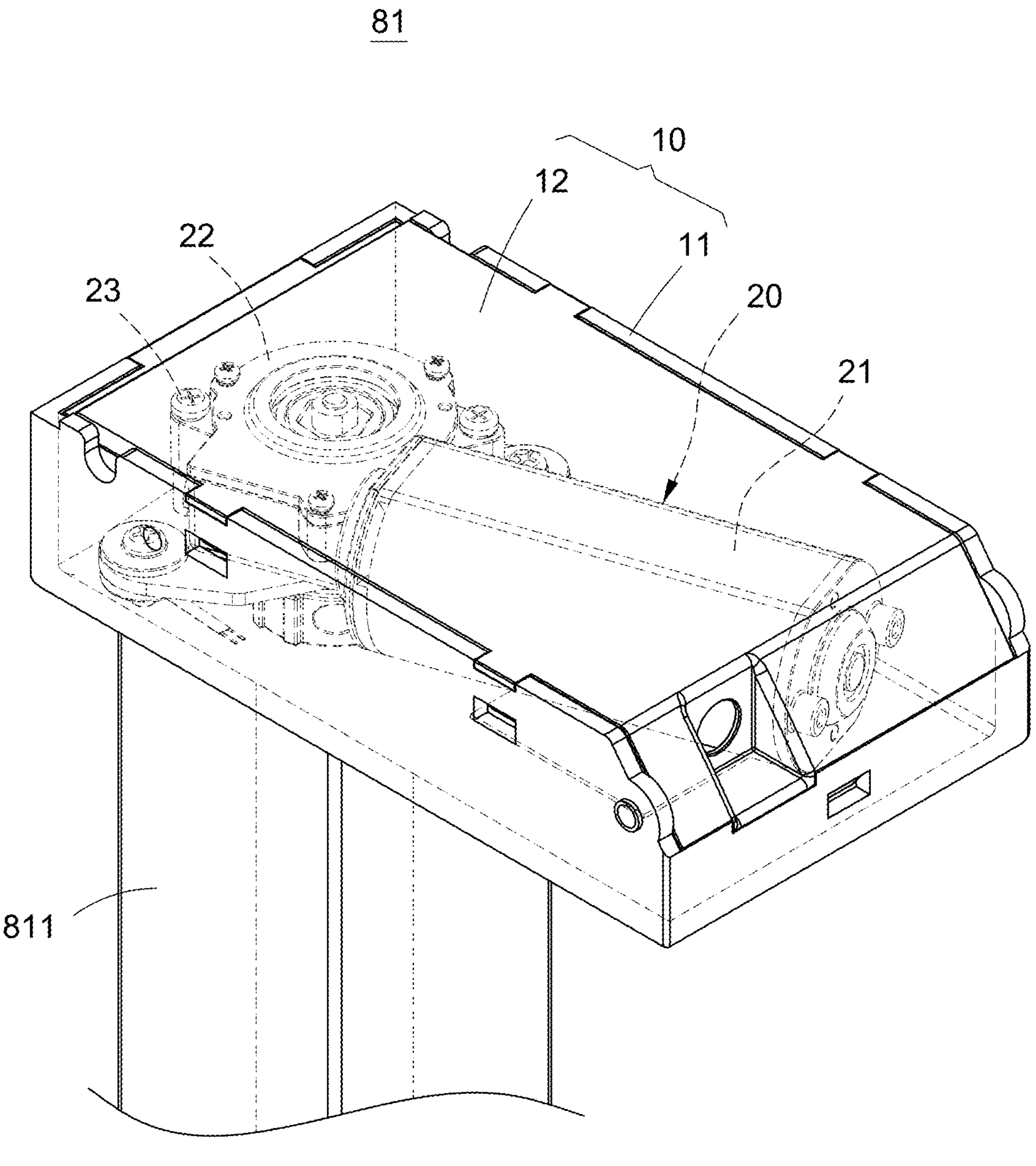
FIG. 2 is a perspective view showing the assembly according to the first embodiment of the present disclosure.
Figure 3:
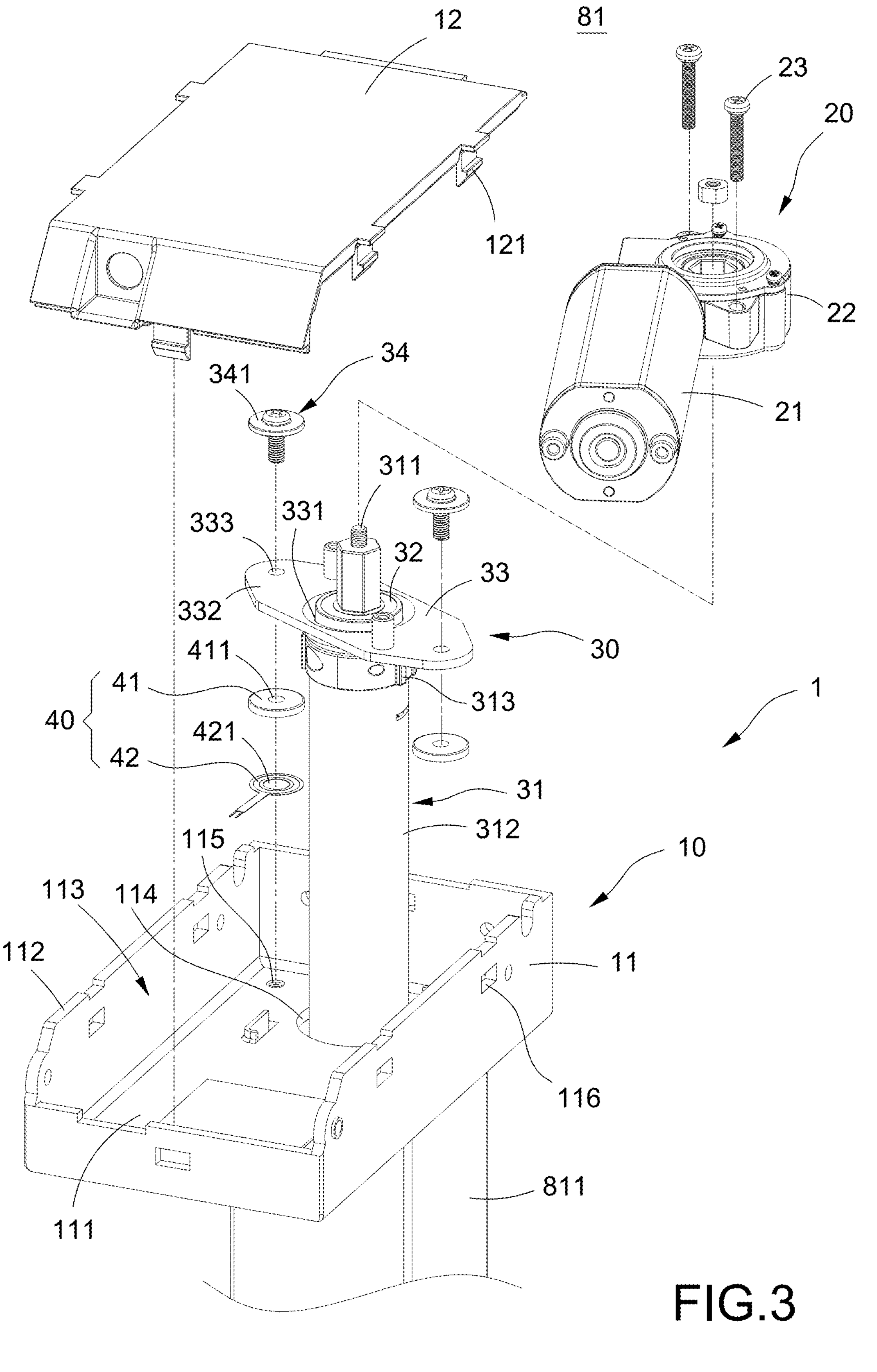
FIG. 3 is an exploded view according to the first embodiment of the present disclosure.
Figure 4:
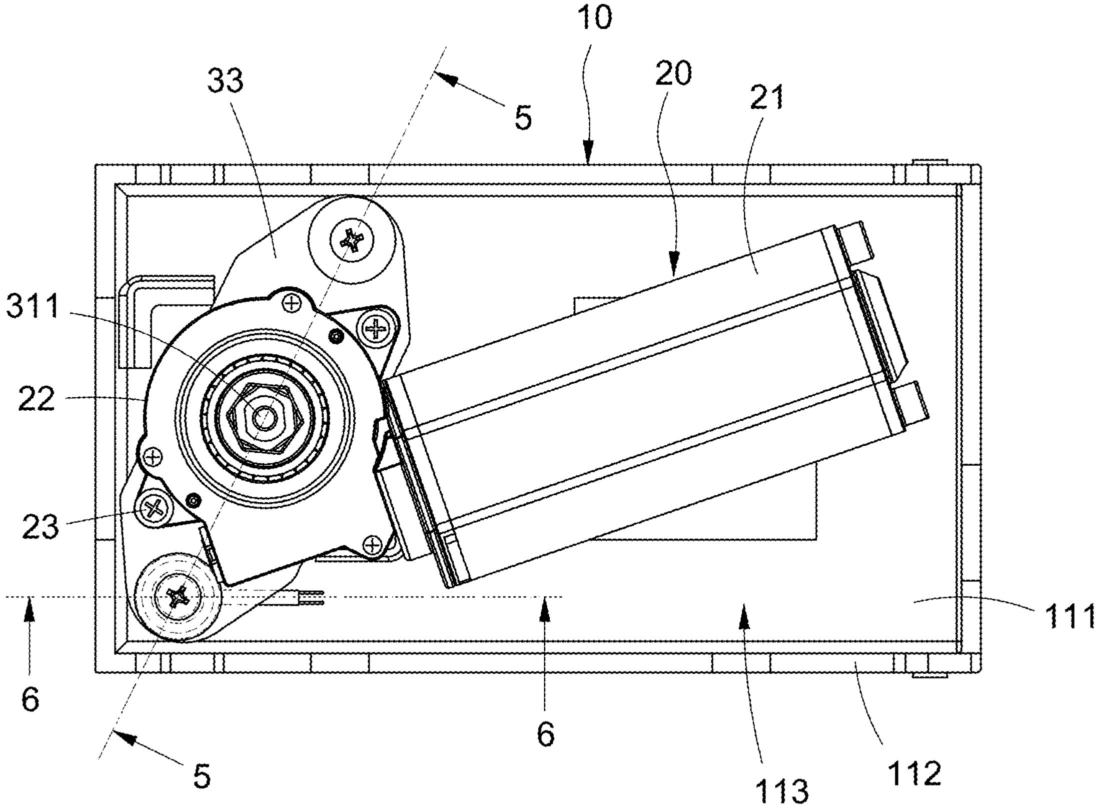
FIG. 4 is a top view showing the assembly according to the first embodiment of the present disclosure.
Figure 5:
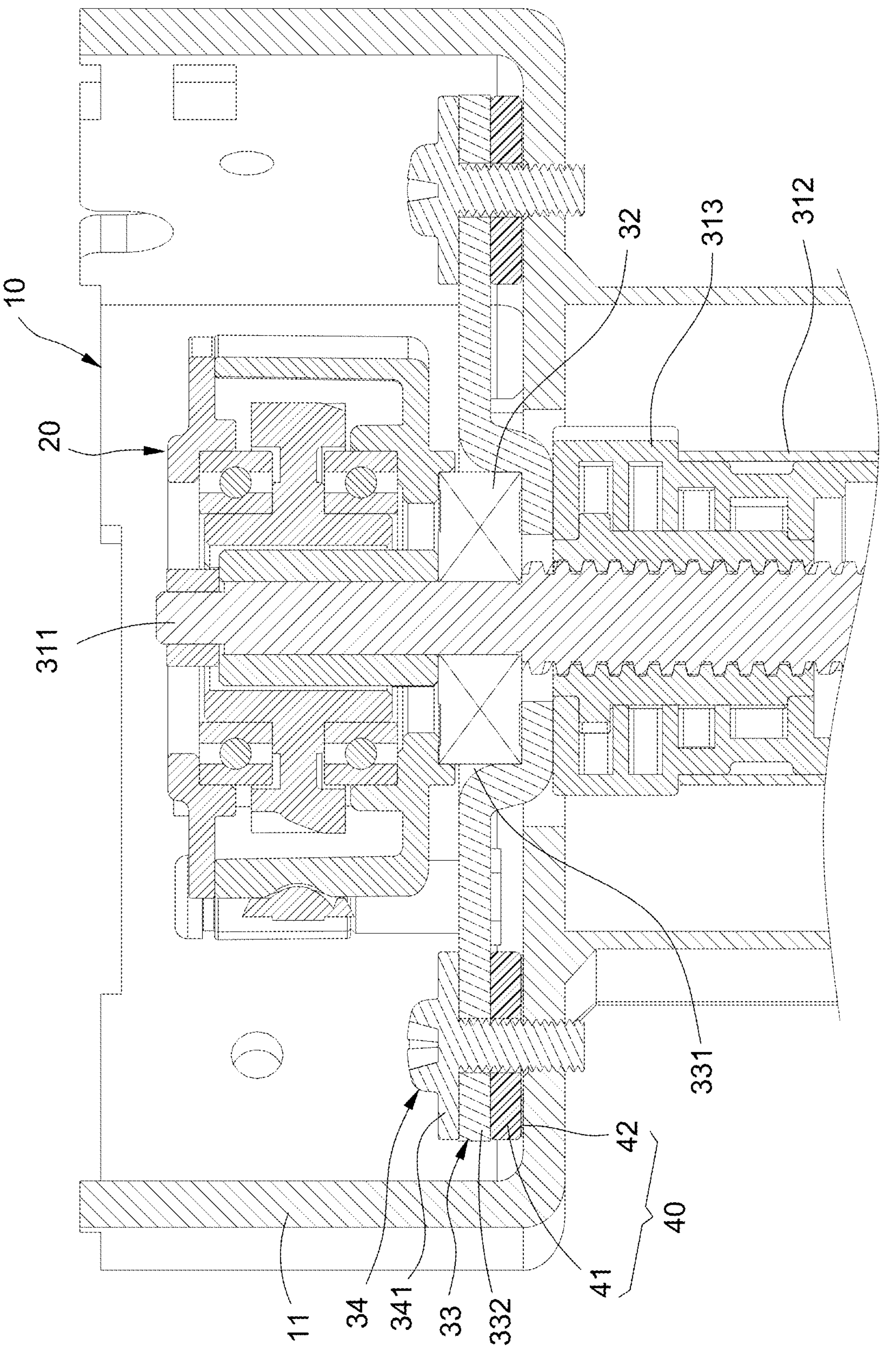
FIG. 5 is a cross sectional view of FIG. 4 taken along a 5-5 dashed line.

The technical contents of this disclosure will become apparent with the detailed description of embodiments accompanied with the illustration of related drawings as follows. It is intended that the embodiments and drawings disclosed herein are to be considered illustrative rather than restrictive.

Please refer from FIG. 1 to FIG. 7, the present disclosure provides a linear actuator with a protection mechanism, which is applied to an electric table 8. The electric table 8 includes at least one lifting column 81 and a table plate 82. The lifting column 81 includes a linear actuator with a protection mechanism 1 and a retractable pipe set 811. The linear actuator with the protection mechanism 1 mainly includes a motor case 10, a drive mechanism 20, a transmission mechanism 30 and a protection structure 40.

Please refer from FIG. 2 to FIG. 5, the motor case 10 is substantially formed in a rectangular shape. The motor case 10 mainly includes a case member 11 and a cover member 12. The case member 11 has a bottom plate 111 and a plurality of side plates 112 connected to the bottom plate 111, and an accommodation chamber 113 is jointly surrounded by the bottom plate 111 and each of the side plates 112. A through hole 114 and a plurality of screw holes 115 are formed on the bottom plate 111. A plurality of buckling slots 116 are formed on each of the side plates 112. The cover member 12 correspondingly covers the case member 11. A plurality of the buckling hooks 121 correspondingly buckled and fastened with the buckling slots 116 are extended from a periphery of the cover member 12.

The drive mechanism 20 is accommodated in the accommodation chamber 113 of the case member 11. The drive mechanism 20 mainly includes a motor 21 and a deceleration gear set 22. The motor 21 is a component capable of generating normal and reverse rotations. The deceleration gear set 22 is connected to one end of the motor 21. The deceleration gear set 22 is formed as an assembly of a worm and a worm gear.

The transmission mechanism 30 mainly includes a machine core 31, a bearing 32 and a base seat 33 and two fasten units 34. The machine core 31 mainly includes a lead screw 311, a hollow pipe 312 and a screw nut 313. The screw nut 313 is fastened at one end of the hollow pipe 312 and mutually screwed with the lead screw 311 for transmissions. The lead screw 311 enters the case member 11 via the through hole 114 to be connected to the drive mechanism 20. The drive mechanism 20 is locked and fastened on a top end of the base seat 33 by each screw 23 being locked. The base seat 33 has a bearing cave 331 and two extending plates 332 protruded from the bearing cave 331 towards opposite directions. A penetrated hole 333 is formed at a distal end of each of the extending plates 332. In this embodiment, the fasten unit 34 is a screw rod and has a head part 341. The bearing 32 is disposed in the bearing cave 331 and sheathes the lead screw 311. The base seat 33 is fastened by each of the fasten units 34 passing each of the penetrated holes 333 and screwed and fastened with each of the screw holes 115. The head part 341 of the fasten unit 34 presses the extending plate 332.

Figure 6:
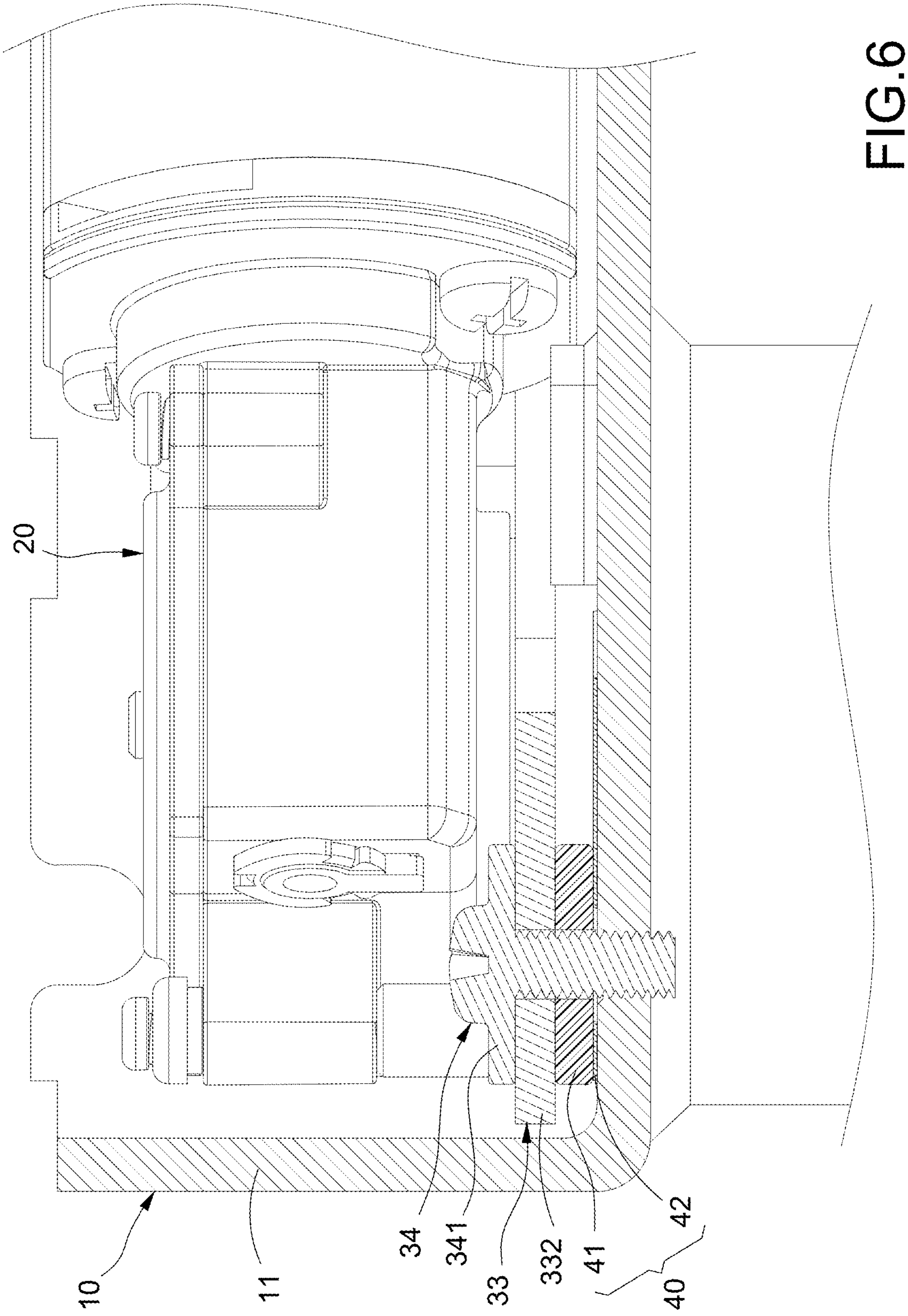
FIG. 6 is a cross sectional view of FIG. 4 taken along a 6-6 dashes line.
Figure 7:
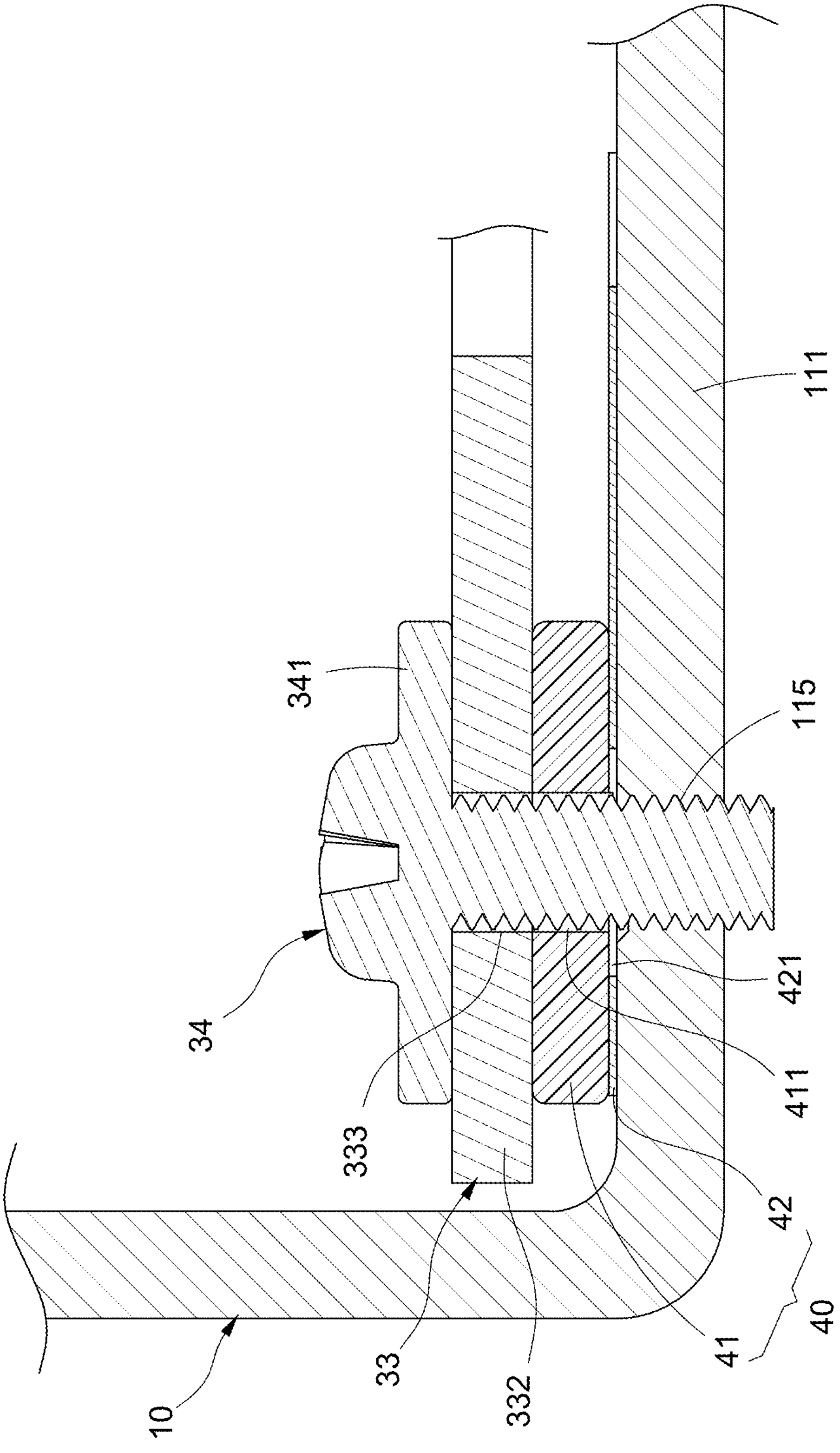
FIG. 7 is a partially enlarged view of FIG. 6.

Please refer from FIG. 6 and FIG. 7, the protection structure 40 disclosed in this embodiment sheathes the fasten unit 34 and is disposed between the bottom plate 111 and the extending plate 332. The protection structure 40 mainly includes an elastic member 41 and a pressure-sensitive sensor 42. The elastic member 41 is a rubber cushioning pad. The elastic member 41 has a hole 411. The pressure-sensitive sensor 42 has a hole 421 attached to a bottom surface of the elastic member 41. The elastic member 41 and the pressure-sensitive sensor 42 sheathe the fasten unit 34 via the hole 411 and the hole 421, and are clamped between the extending plate 332 and the bottom plate 111, thus when the elastic member 41 is compressed, the elastic member 41 generates a pre-stressed pressure relative to the pressure-sensitive sensor 42. The aforesaid structure is suitable to be applied in a push-type linear actuator.

In some embodiments, the pressure-sensitive sensor 42 is a resistance strain pressure-sensitive sensor. When an action force is applied to the elastic member 41, the pressure-sensitive sensor 42 generates a deformation to make a resistance value be varied. An electric signal is sent after the variation of the resistance value is processed by a control equipment (not shown in figures). General strain gauges are a metal resistance strain gauge and a semi-conductor strain gauge.

When being operated, the pressure-sensitive sensor 42 senses a pre-stressed pressure generated by the elastic member 41 being compressed after the lifting column 81 encounters an obstacle during a lifting process. When a load applied to the lifting column 81 increases, the extending plate 332 of the base seat 33 further compresses the elastic member 41, the pressure-sensitive sensor 42 is subjected to a greater pressure, thus the resistance value is smaller. When the load applied to the lifting column 81 decreases, the compressing amount of the elastic member 41 caused by being compressed by the extending plate 332 of the base seat 33 decreases, the pressure-sensitive sensor 42 is subjected to a smaller pressure, thus the resistance value increases.

When the load applied to the lifting column 81 changes, the compressing amount of the elastic member 41 caused by being compressed by the extending plate 332 of the base seat 33 changes, thus the pressure applied by the elastic member 41 to the pressure-sensitive sensor 42 changes. As such, the resistance value changes when the pressure subjected to the pressure-sensitive sensor 42 changes. Accordingly, a protection effect is provided to the lifting column 81 by the control equipment proceeding a power shunting process or making the motor 21 generate rotations in an opposite direction.

Figure 8:
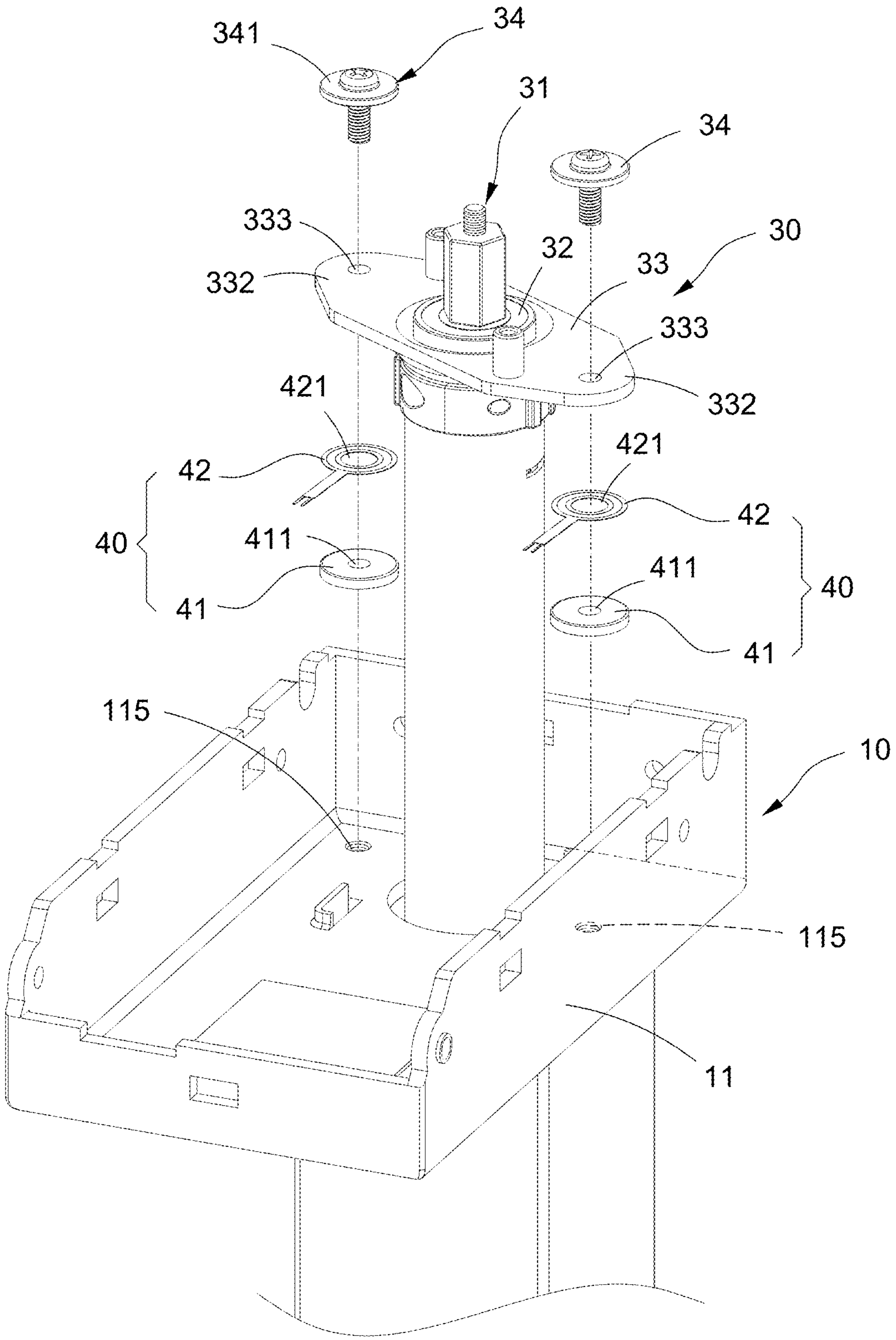
FIG. 8 is an exploded view according to the second embodiment of the present disclosure.
Figure 9:
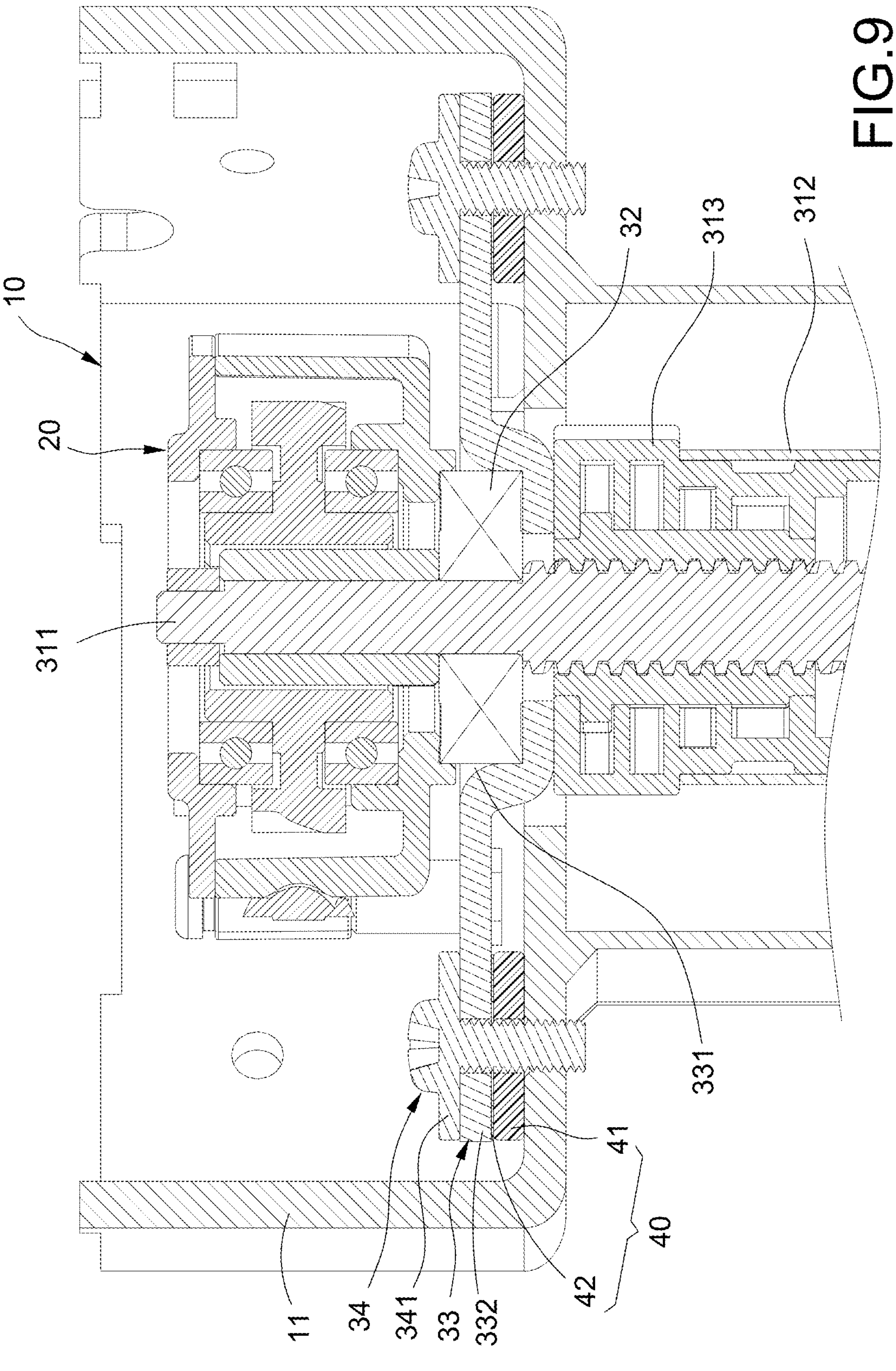
FIG. 9 is a cross sectional view showing the assembly according to the second embodiment of the present disclosure.

Please refer to FIG. 8 and FIG. 9, which disclose the second embodiment of the present disclosure. The structure of the linear actuator with the protection mechanism disclosed in this embodiment is substantially the same as the structure disclosed in the first embodiment. The differences between the second embodiment and the first embodiment are as follows. The amount of the protection structure 40 is two. The two protection structures 40 are respectively disposed between the two extending plates 332 of the base seat 33 and the bottom plate 111. Each of the pressure-sensitive sensors 42 are respectively attached on a top surface of each of the elastic members 41. Each of the elastic members 41 and each of the pressure-sensitive sensors 42 sheathe each of the fasten units 34 via the hole 411 and the hole 421, and are clamped between each of the extending plates 332 and the bottom plate 111. The aforesaid structure is suitable to be applied in a pull-type linear actuator.

Figure 10:
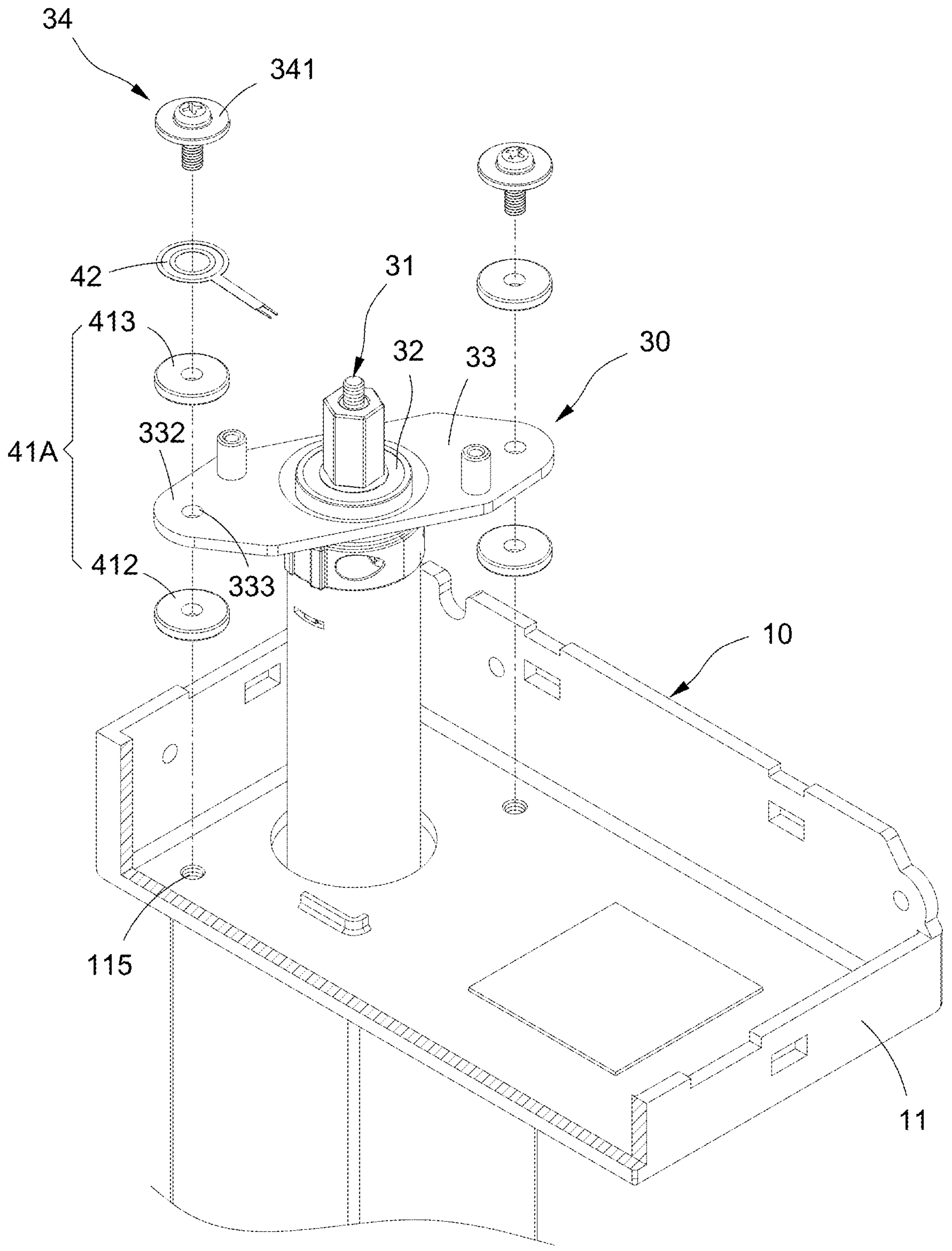
FIG. 10 is an exploded view according to the third embodiment of the present disclosure.
Figure 11:
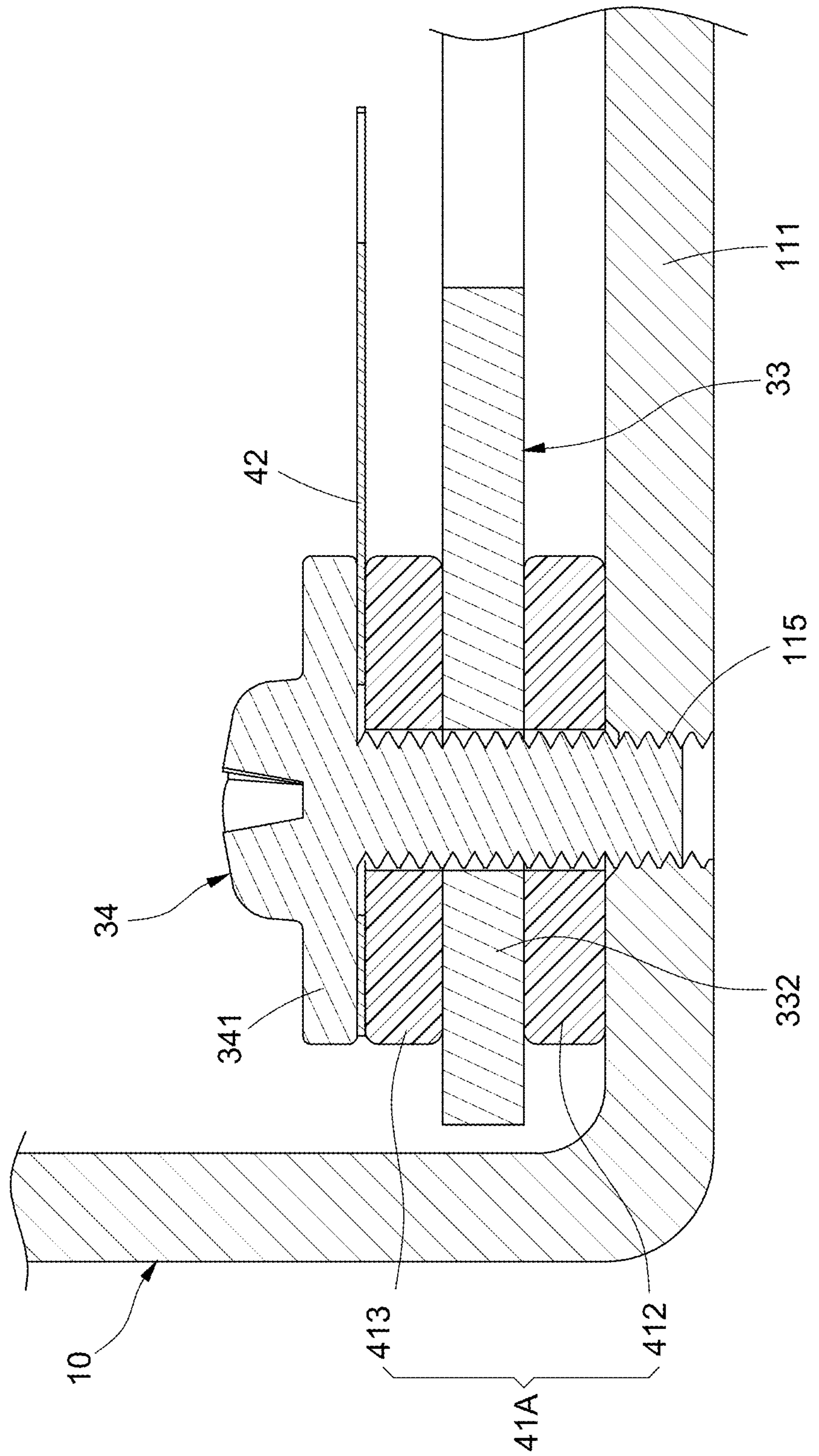
FIG. 11 is a cross sectional view showing the assembly according to the third embodiment of the present disclosure.

Please refer to FIG. 10 and FIG. 11, which disclose the third embodiment of the present disclosure. The differences between linear actuator with the protection mechanism disclosed in this embodiment and each of the aforesaid embodiments are as follows. The protection structure 40 mainly includes an elastic member 41A and the pressure-sensitive sensor 42. The elastic member 41A includes a first elastic pad 412 and a second elastic pad 413. The first elastic pad 412 is disposed between the extending plate 332 of the base seat 33 and the bottom plate 111 of the case member 11. The second elastic pad 413 is disposed between the head part 341 of the fasten unit 34 and the extending plate 332 of the base seat 33. The pressure-sensitive sensor 42 is disposed between the head part 341 of the fasten unit 34 and the second elastic pad 413.

Figure 12:
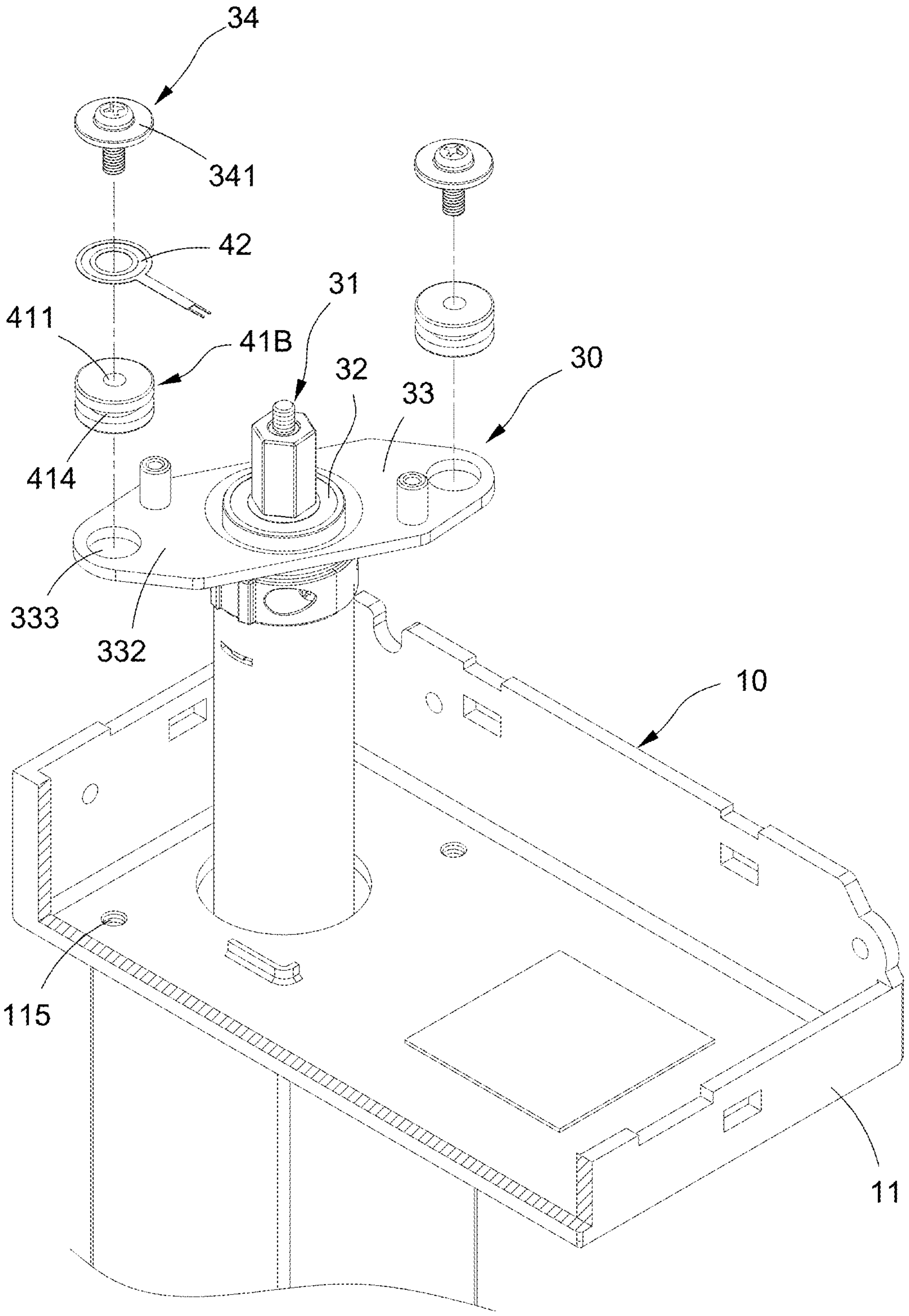
FIG. 12 is an exploded view according to the fourth embodiment of the present disclosure.
Figure 13:
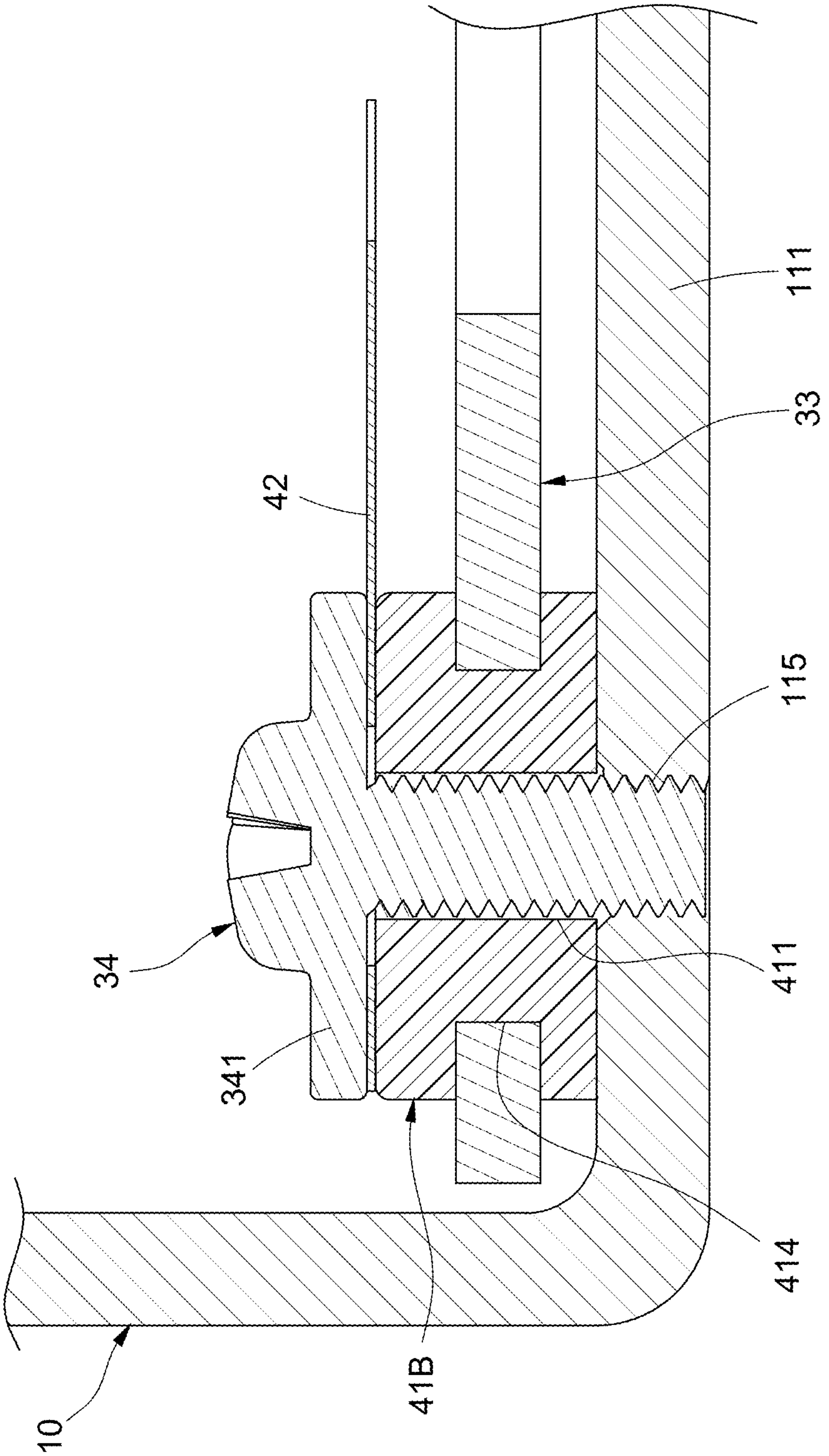
FIG. 13 is a cross sectional view showing the assembly according to the fourth embodiment of the present disclosure.

Please refer to FIG. 12 and FIG. 13, which disclose the fourth embodiment of the present disclosure. The differences between linear actuator with the protection mechanism disclosed in this embodiment and each of the aforesaid embodiments are as follows. The protection structure 40 mainly includes an elastic member 41B and the pressure-sensitive sensor 42. The elastic member 41B has a mounting slot 414. The mounting slot 414 is used to make the penetrated hole 333 of the extending plate 332 be mounted, thus a top side and a bottom side of the extending plate 332 are respectively formed with a partial elastic member. The pressure-sensitive sensor 42 is disposed between the head part 341 of the fasten unit 34 and a top surface of the elastic member 41B.

Figure 14:
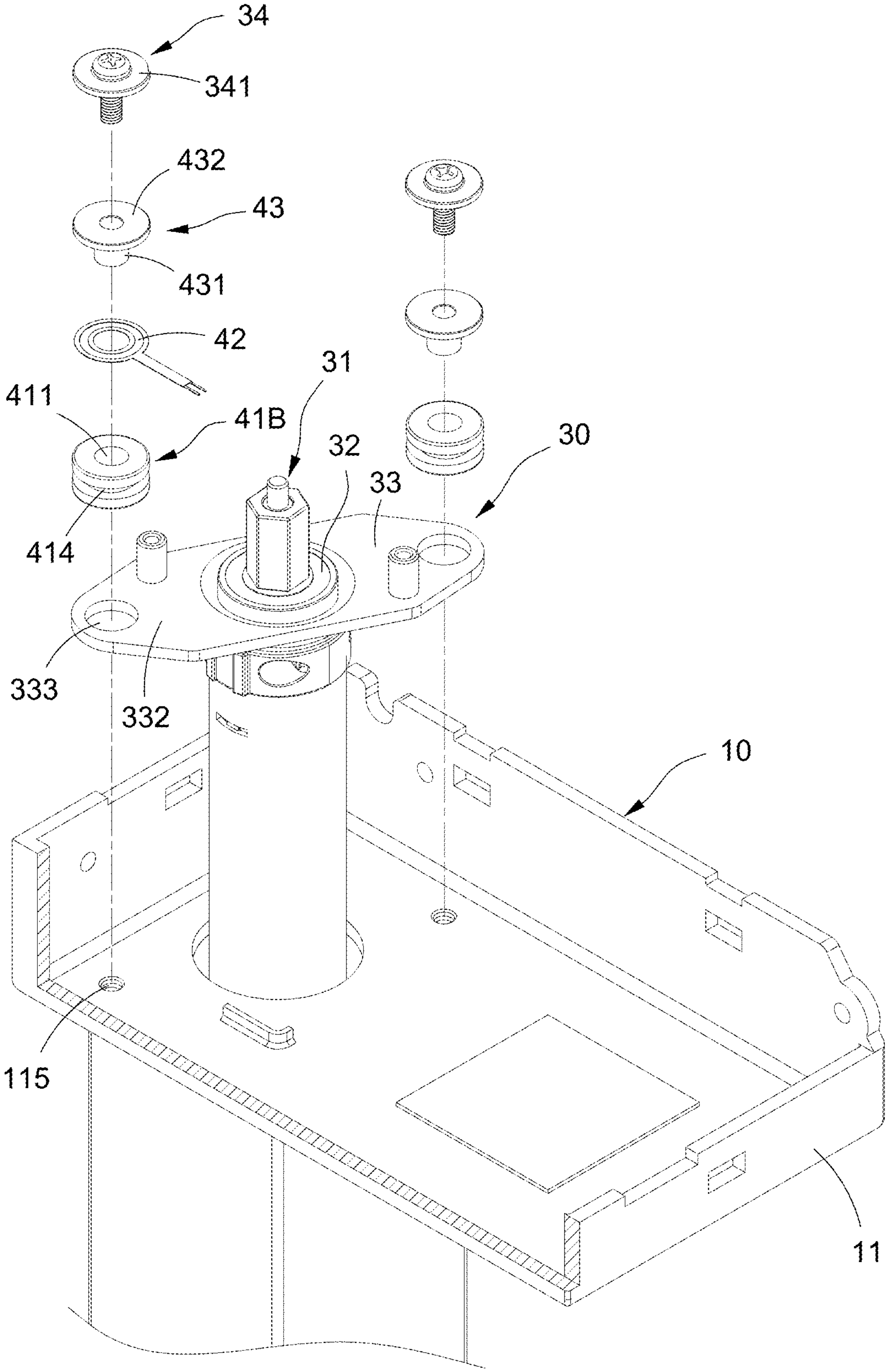
FIG. 14 is an exploded view according to the fifth embodiment of the present disclosure.
Figure 15:
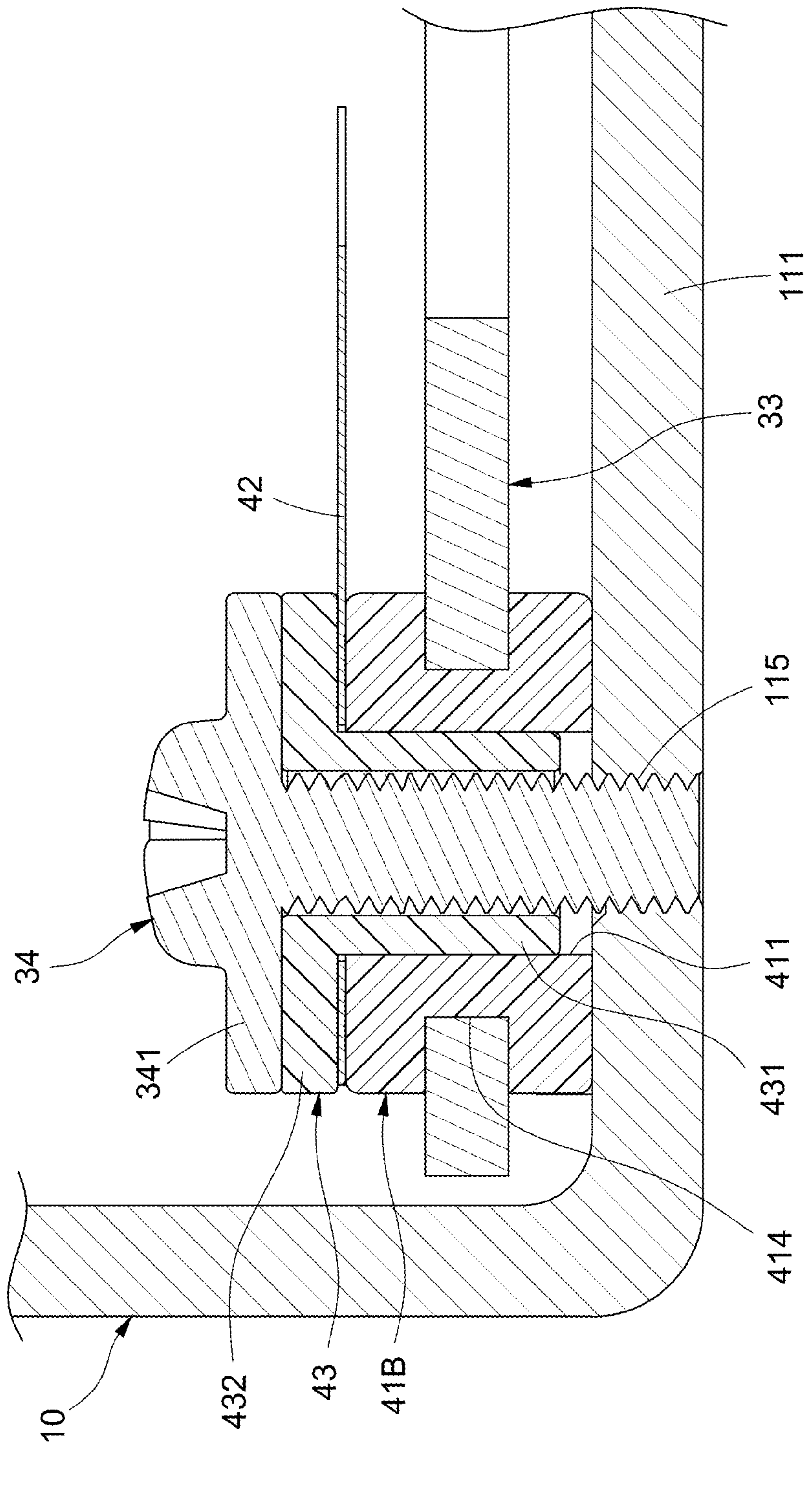
FIG. 15 is a cross sectional view showing the assembly according to the fifth embodiment of the present disclosure.

Please refer to FIG. 14 and FIG. 15, which disclose the fifth embodiment of the present disclosure. The differences between linear actuator with the protection mechanism disclosed in this embodiment and the fourth embodiment are as follows. The protection structure 40 further includes a column plug 43. The column plug 43 has a hollow column 431 and a flange 432 radially extended from one end of the hollow column 431. The hollow column 431 passes the hole 411 of the elastic member 41B to make the elastic member 41B be positioned between the flange 432 and the bottom plate 111 of the case member 11. The pressure-sensitive sensor 42 is disposed between the flange 432 of the column plug 43 and the top surface of the elastic member 41B.

Figure 16:
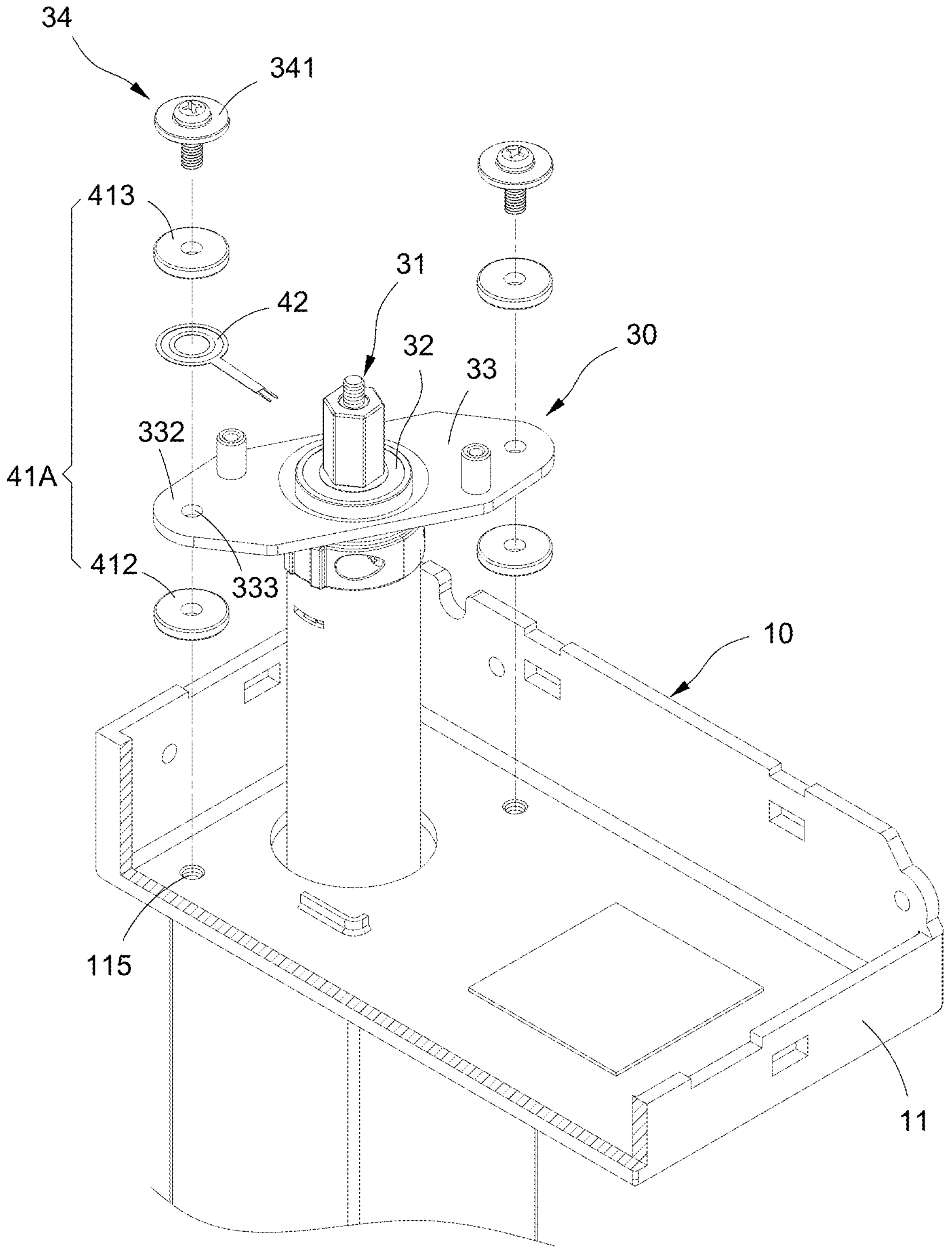
FIG. 16 is an exploded view according to the sixth embodiment of the present disclosure.
Figure 17:
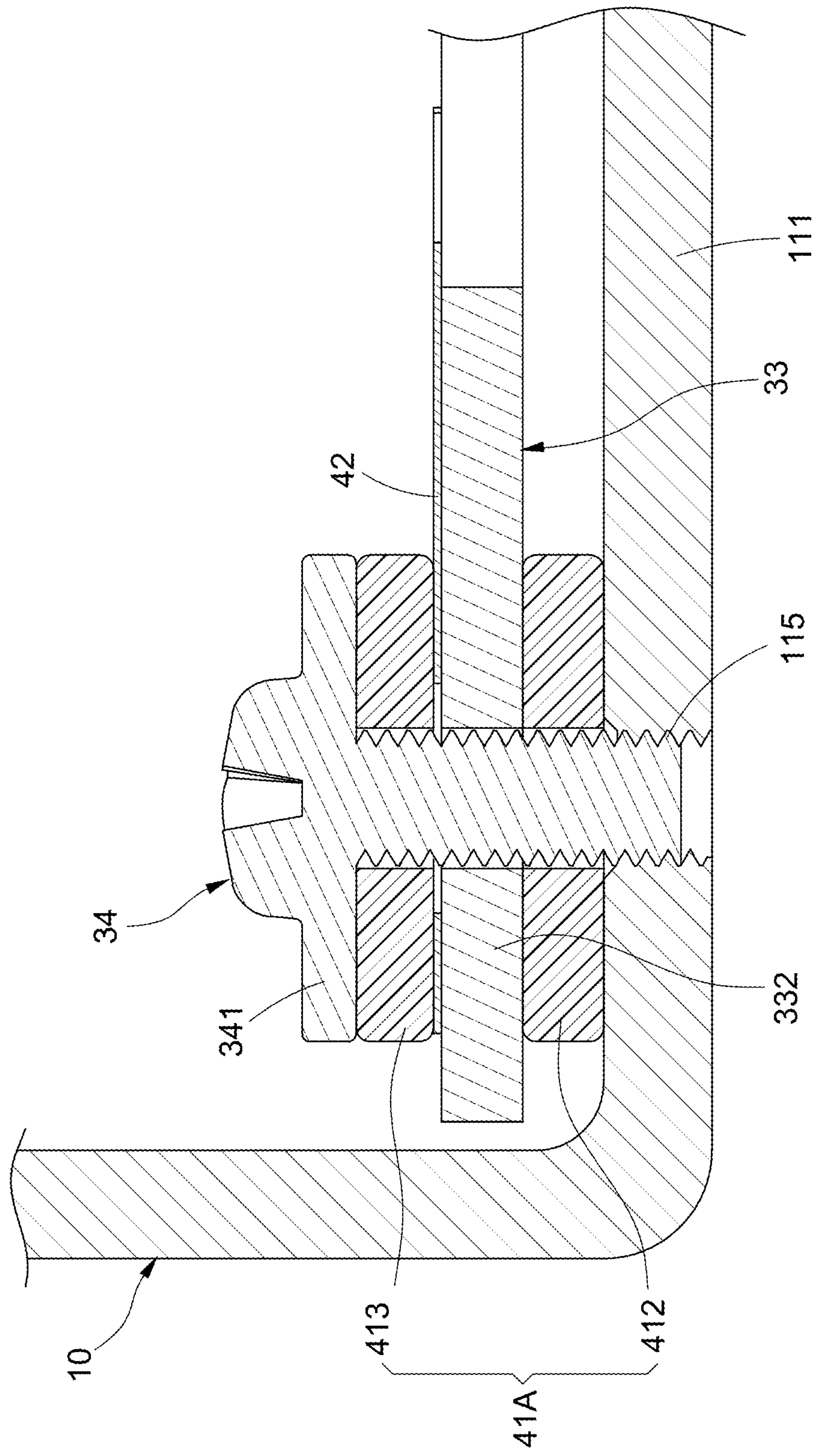
FIG. 17 is a cross sectional view showing the assembly according to the sixth embodiment of the present disclosure.

Please refer to FIG. 16 and FIG. 17, which disclose the sixth embodiment of the present disclosure. The differences between linear actuator with the protection mechanism disclosed in this embodiment and the third embodiments are as follows. The protection structure 40 mainly includes the elastic member 41A and the pressure-sensitive sensor 42. The elastic member 41A includes the first elastic pad 412 and the second elastic pad 413. The first elastic pad 412 is disposed between the extending plate 332 of the base seat 33 and the bottom plate 111 of the case member 11. The second elastic pad 413 is disposed between the head part 341 of the fasten unit 34 and the extending plate 332 of the base seat 33. The pressure-sensitive sensor 42 is disposed between the second elastic pad 413 and the extending plate 332 of the base seat 33.

Figure 18:
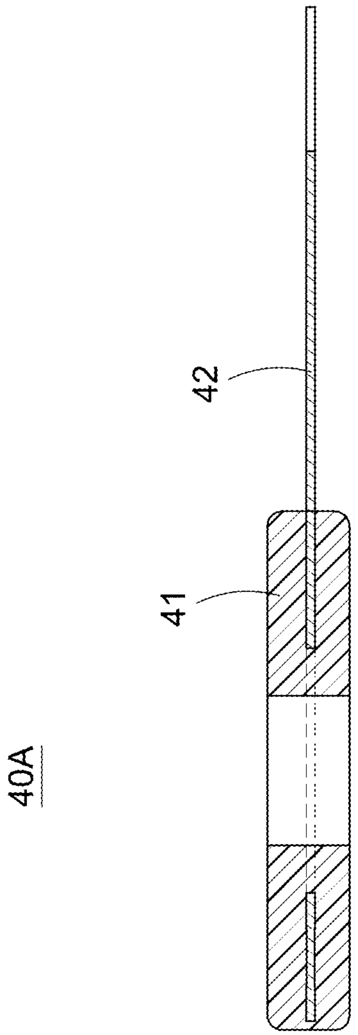
FIG. 18 is a cross sectional view showing the assembly of the protection structure according to another embodiment of the present disclosure.

Please refer to FIG. 18, which disclose another embodiment of the present disclosure. The differences between a protection structure 40A disposed in this embodiment and the protection structure 40 disclosed in each of the aforesaid embodiments are as follows. The protection structure 40A mainly includes the elastic member 41 and the pressure-sensitive sensor 42. The pressure-sensitive sensor 42 is embedded in the elastic member 41. The hole 421 of the pressure-sensitive sensor 42 and the hole 411 of the elastic member 41 are correspondingly arranged. The aforesaid structure is suitable to be applied in a push-pull-type linear actuator.

While this disclosure has been described by means of specific embodiments, numerous modifications and variations could be made thereto by those skilled in the art without departing from the scope and spirit of this disclosure set forth in the claims.

What is claimed is:

1. A linear actuator (1), comprising:

a motor case (10), comprising a case member (11), wherein the case member (11) comprises a bottom plate (111), and a through hole (114) is defined on the bottom plate (111);

a drive mechanism (20), accommodated in the case member (11);

a transmission mechanism (30), comprising a machine core (31), a bearing (32), a base seat (33) and a fasten unit (34), wherein the machine core (31) passes through the through hole (114) and is connected to the drive mechanism (20), the base seat (33) comprises an extending plate (332), the extending plate (332) comprises a penetrated hole (333), the bearing (32) is disposed on the base seat (33) and adapted to sheathe the machine core (31), and the fasten unit (34) comprises a head part (341); and an elastic member (41) and a pressure-sensitive sensor (42), adapted to sheathe the fasten unit (34) and disposed between the bottom plate (111) and the head part (341);

wherein the elastic member (41) comprises a first hole (411), the pressure-sensitive sensor (42) comprises a second hole (421), the second hole (421) of the pressure-sensitive sensor (42) and the first hole (411) of the elastic member (41) are correspondingly arranged, and the fasten unit (34) passes through the penetrated hole (333), the first hole (411) and the second hole (421) to be fastened with the bottom plate (111).

2. The linear actuator (1) according to claim 1, wherein the base seat (33) further comprises a bearing cave (331), the extending plate (332) is extended from the bearing cave (331), and the bearing (32) is disposed in the bearing cave (331).

3. The linear actuator (1) according to claim 2, wherein the elastic member (41) and the pressure-sensitive sensor (42) are disposed between the bottom plate (111) and the extending plate (332) and are stacked with each other.

4. The linear actuator (1) according to claim 3, wherein the pressure-sensitive sensor (42) is disposed between the bottom plate (111) and the elastic member (41).

5. The linear actuator (1) according to claim 3, wherein the pressure-sensitive sensor (42) is disposed between the elastic member (41) and the extending plate (332).

6. The linear actuator (1) according to claim 1, wherein an amount of the extending plate (332), the elastic member (41) and the pressure-sensitive sensor (42) are all multiple.

7. The linear actuator (1) according to claim 1, wherein the pressure-sensitive sensor (42) is embedded in the elastic member (41).

* * * * *